US012636642B2

(12) United States Patent
Lu et al.

(10) Patent No.: US 12,636,642 B2
(45) Date of Patent: May 26, 2026

(54) PORPHYRIN-BASED METAL COORDINATION CONJUGATED POLYMER, PREPARATION METHOD THEREFOR, AND APPLICATION THEREOF IN PHOTOCATALYTIC DEGRADATION OF ORGANIC POLLUTANTS

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 920 days.

(21) Appl. No.: 17/912,539

(22) PCT Filed: Dec. 17, 2021

(86) PCT No.: PCT/CN2021/139074
§ 371 (c)(1),
(2) Date: Sep. 19, 2022

(87) PCT Pub. No.: WO2022/083795
PCT Pub. Date: Apr. 28, 2022

(65) Prior Publication Data
US 2023/0132599 A1 May 4, 2023

(51) Int. Cl.
*B01J 31/16* (2006.01)
*C02F 1/30* (2023.01)
*C02F 101/34* (2006.01)

(52) U.S. Cl.
CPC ............ *B01J 31/1691* (2013.01); *C02F 1/30* (2013.01); *B01J 2531/025* (2013.01); *C02F 2101/345* (2013.01)

(58) Field of Classification Search
None
See application file for complete search history.

(56) References Cited

FOREIGN PATENT DOCUMENTS

| | | |
|---|---|---|
| CN | 102206328 A | 10/2011 |
| CN | 102417586 A | 4/2012 |
| CN | 102453234 A | 5/2012 |

(Continued)

OTHER PUBLICATIONS

Machine translation of CN 109134830 (Year: 2019).*

(Continued)

*Primary Examiner* — Megan Mcculley
(74) *Attorney, Agent, or Firm* — SZDC Law PC

(57) ABSTRACT he invention discloses a porphyrin-based metal coordination conjugated polymer, a preparation method therefor, and an application thereof in photocatalytic degradation of organic pollutants. The catalyst of the present invention has an 18π-conjugated skeleton, a nearly planar macrocyclic molecule, a stable rigid structure and a very stable highly conjugated system, so that the catalyst has excellent photoelectric conversion efficiency, a wide range of absorption spectra, strong redox capacity, and good chemical and thermal stability. A metal coordinated porphyrin acts as active center, a large number of derivatives can be derived, and the method has emerged as a promising alternative for the photocatalytic degradation of environmental pollutants and the like.

8 Claims, 2 Drawing Sheets

(56) References Cited

FOREIGN PATENT DOCUMENTS

| | | | | | |
|---|---|---|---|---|---|
| CN | 107021939 A | | 8/2017 | | |
| CN | 107899618 A | | 4/2018 | | |
| CN | 109134830 A | * | 1/2019 | ............ | C08G 1/126 |
| CN | 112111070 A | | 12/2020 | | |

OTHER PUBLICATIONS

Song Lin et al., "Covalent organic frameworks comprising cobalt porphyrins for catalytic CO2 reduction in water" Science, vol. 349, Issue 6253, pp. 1208-1213 (Sep. 11, 2015).
Ziping Li et al., "Covalent organic framework as an efficient, metal-free, heterogeneous photocatalyst for organic transformations under visible light" Applied Catalysis B: Environmental 245 (2019) 334-342 (Dec. 26, 2018).
Rui Shen et al., "A porphyrin porous organic polymer with bicatalytic sites for highly efficient one-pot tandem catalysis" ChemComm 2019, 55, 822-825 (Dec. 23, 2018).

* cited by examiner

PORPHYRIN-BASED METAL COORDINATION CONJUGATED POLYMER, PREPARATION METHOD THEREFOR, AND APPLICATION THEREOF IN PHOTOCATALYTIC DEGRADATION OF ORGANIC POLLUTANTS

This application is the National Stage Application of PCT/CN2021/139074, filed on Dec. 17, 2021, which claims priority to Chinese Patent Application No. 202011128871.3, filed on Oct. 20, 2020, which is incorporated by reference for all purposes as if fully set forth herein.

TECHNICAL FIELD

The invention relates to the technical field of conjugated organic polymer functional materials, and also relates to the field of photocatalytic oxidation, in particular, to a conjugated organic polymer based on porphyrin, its preparation method and application in organic pollutants removal from water.

BACKGROUND TECHNIQUE

With the rapid development of global industrialization, excessive harmful substances have been poured to the environment, which seriously deteriorated the ecological system. Environmental pollution has become an urgent issue for human beings. As a novel sustainable technology, photocatalysis can convert solar energy into electrical and chemical energy. Meanwhile, various active species can be generated to degrade organic pollutants into non-toxic substances under illumination. Photocatalysis technology can realize the full sunlight utilization at room temperature, which possesses the advantages such as low cost and pollution-free, and shows broad prospects in the treatment of organic pollutants in water.

Till now, photocatalysts can be mainly divided into inorganic semiconductors and organic photocatalysts. Traditional inorganic semiconductors exhibited the characteristics of favorable catalytic activity and wide application range. However, most of them are metal-based semiconductors that are not only costly but aggravate metal ion pollution. Comparatively, organic photocatalysts will become ideal candidates in the field of photocatalysis because of their diversity, easily tunable molecular structure and wide spectral response range.

Technical Solutions

The aim of the present invention is to provide a metalloporphyrin-based conjugated polymer photocatalyst and its preparation method, which can achieve the purpose of effectively removing organic pollutants in water through the photocatalytic reaction. First, the porphyrin-based conjugated polymer exhibited a wide adsorption range (200-800 nm) of the solar spectrum due to the extended conjugated structure of porphyrin. On the other hand, the incorporation of metal ions improved the charge separation and exposed more metal reactive sites, and more active species with stronger oxidizing ability can be generated to enhance the photocatalytic activity for organic pollutants degradation. In particular, the porphyrin-based conjugated polymer in the present invention shows the morphology of hollow nanotubes, which promotes the adsorption of organic pollutants in water and surface catalytic reactions.

In order to achieve the above purposes, the specific technical proposal of the invention is as follows:

A preparation method of a metalloporphyrin-based conjugated polymer including: under inert atmosphere, metalloporphyrin-based conjugated polymer (MTAPP-BT) is prepared through a solvothermal method by metalloporphyrin (MTAPP) and 4,7-bis(4-formylphenyl)-2,1,3-benzothiadiazole (BT).

A method for removing organic pollutants from water including the following steps:

1) Under inert atmosphere, metalloporphyrin-based conjugated polymer (MTAPP-BT) is synthesized through a solvothermal reaction of metalloporphyrin (MTAPP) and 4,7-bis (4-formylphenyl)-2,1,3-benzothiadiazole (BT).
2) The metalloporphyrin-based conjugated polymer photocatalyst is added to the water containing organic pollutants, and the organic pollutants are removed in the water under irradiation.

In the present invention, 5,10,15,20-tetra(4-nitrophenyl) porphyrin is synthesized by 4-nitrobenzaldehyde and pyrrole, and 5,10,15,20-tetra(4-aminophenyl) porphyrin is obtained through a reduction of nitro group with a reductant in concentrated hydrochloric acid. Under $N_2$ atmosphere, metalloporphyrin (MTAPP) is obtained by a reflux reaction between 5,10,15,20-tetra(4-aminophenyl) porphyrin and a metal acetate in a mixed solvent. Specifically, 5,10,15,20-tetra(4-nitrophenyl) porphyrin is synthesized by 4-nitrobenzaldehyde and pyrrole in a single solvent under a catalyst. After recrystallization and purification, 5,10,15,20-tetra(4-aminophenyl) porphyrin is obtained by reduction with a reducing agent in concentrated hydrochloric acid. Under the protection of $N_2$, metalloporphyrin is obtained after recrystallization and purification by refluxing 5,10,15,20-tetra(4-aminophenyl)-porphyrin and a metal acetate in a mixed solvent.

In the present invention, 4,7-bis(4-formylphenyl)-2,1,3-benzothiadiazole is obtained by a palladium-catalyzed coupling reaction between 4-formylphenylboronic acid and 4,7-dibromo-2,1,3-benzothiadiazole. Preferably, the coupling reaction is carried out in an alkaline environment, under $N_2$ atmosphere and in a solvent.

In the present invention, the porphyrin-based conjugated polymer photocatalysts are obtained through the solvothermal method between metalloporphyrin and 4,7-bis(4-formylphenyl)-2,1,3-benzothiadiazole as raw materials.

In the preparation of metalloporphyrin described in the present invention, a molar ratio of 4-nitrobenzaldehyde and pyrrole is 1:1-1.2, preferably 1:1. The single solvent is propionic acid and the catalyst is acetic anhydride, a volume ratio of propionic acid and acetic anhydride is 10:0.3-0.6, preferably 10:0.4. The reaction is performed at 140-160° C. for 30-60 min. In the recrystallization, the solvent is pyridine, the reaction is performed at 115-125° C. for 60-90 min. In the reduction reaction, a ratio of 5,10,15,20-tetra(4-nitrophenyl) porphyrin, concentrated hydrochloric acid, and reductant is 2 g:150-200 mL:8-10 g, the reductant is stannous chloride, the reaction is performed at 70-90° C. for 30-60 min. Concentrated ammonia is used as a pH regulator to adjust pH value to 9-10. In the metal coordination process, copper acetate hydrate, anhydrous zinc acetate or iron acetate hydrate is selected as the metal acetate salt, a molar ratio of 5,10,15,20-tetra(4-aminophenyl) porphyrin and the metal acetate is 1:2-4, preferably 1:4. The mixed solvent is N,N-dimethylformamide and chloroform with a volume ratio of 1:1-3, preferably 1:3, the reflux reaction is conducted at 80-90° C. for 12-36 h.

In the preparation of 4,7-bis(4-formylphenyl)-2,1,3-benzothiadiazole described in present invention, sodium carbonate or cesium carbonate is selected as a Lewis base to provide alkaline environment, preferably cesium carbonate. A molar ratio of 4,7-dibromo-2,1,3-benzothiadiazole and 4-formylphenylboronic acid is 1:2-3, preferably 1:2.5. The solvent is anhydrous toluene/anhydrous ethanol with a volume ratio of 5:3-4. The palladium catalyst is tetrakis(triphenylphosphine)palladium, an amount of the palladium catalyst is 18-22 wt % of 4,7-dibromo-2,1,3-benzothiadiazole. The coupling reaction is conducted at 75-85° C. for 12-24 h.

In the preparation of metalloporphyrin-based conjugated polymer described in present invention, a molar ratio of the metalloporphyrin and 4,7-bis(4-formylphenyl)-2,1,3-benzothiadiazole is 1:2-3, preferably 1:2.5. The solvent is o-dichlorobenzene/n-butanol with volume ratio of 1:1. The catalyst is 3-6 mol/L acetic acid, preferably 6 mol/L. The solvothermal method is conducted at 100-140° C. for 48-96 h. A purification by Soxhlet extraction is carried out, the solvents are dioxane and acetone, and the washing time is 12-36 h.

In the present invention, the organic pollutants were phenolic pollutants. Visible light or simulated visible light is selected as light source.

Beneficial Effects

Compared with the prior art, the advantages of the present invention are as follow:

1) The metalloporphyrin-based conjugated polymer disclosed in the present invention are photocatalysts and show the advantages of stable skeleton, abundant source of raw materials, low cost and diversified synthesis and modification methods.
2) The metalloporphyrin-based conjugated polymer disclosed in the present invention exhibit a hollow nanotube morphology with large specific surface area which provides variety of active sites, thereby promoting the adsorption of organic pollutants in water and the surface catalytic reaction and improving the photocatalytic efficiency.
3) The metalloporphyrin-based conjugated polymer disclosed in the present invention show a wide spectral absorption range (200-800 nm), which are excellent visible-light driven photocatalysts.
4) The metalloporphyrin-based conjugated polymer disclosed in the present invention exhibit improved intramolecular charge separation efficiency due to the introduction of coordination metal, meanwhile more metal active sites can be exposed to generate more active species with more oxidizing activity, resulting in enhanced photocatalytic activity for organic pollutants degradation.

DETAILED DESCRIPTION

Figure 1:
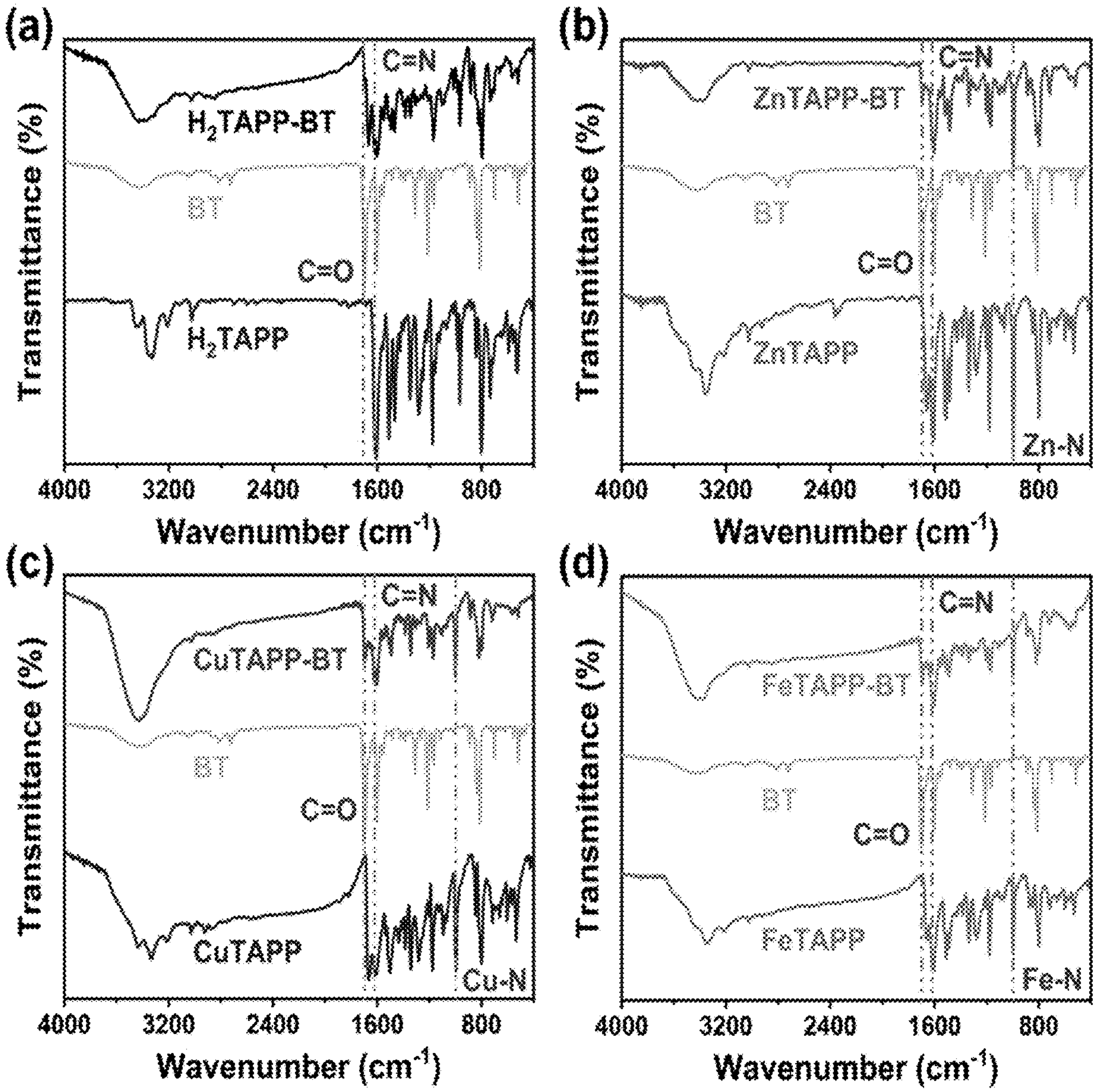
FIG. 1 shows the infrared spectra of metalloporphyrin-based conjugated polymers in Example 3 (a), Example 4 (b), Example 5 (c) and Example 6 (d).

In the present invention, the preparation method of the metalloporphyrin-based conjugated polymer is as follows: Synthesis of metalloporphyrin (MTAPP) and 4,7-bis(4-formylphenyl)-2,1,3-benzothiadiazole (BT) monomers, under inert atmosphere, the metalloporphyrin-based conjugated polymer (MTAPP-BT) was prepared through a solvothermal reaction.

A metalloporphyrin-based conjugated polymer photocatalyst, and its preparation method is as follows:

(1) First, 5,10,15,20-tetra(4-nitrophenyl) porphyrin was synthesized from 4-nitrobenzaldehyde and pyrrole. After recrystallization and purification, it was dissolved in concentrated hydrochloric acid for reduction of nitro group by the reductant to obtain 5,10,15,20-tetra(4-aminophenyl) porphyrin. Under the protection of $N_2$, metalloporphyrin monomer was obtained by a reflux reaction between 5,10,15,20-tetra(4-aminophenyl) porphyrin and the metal acetate in a mixed solvent, recrystallization and purification.

(2) Under the protection of $N_2$, 4,7-bis(4-formylphenyl)-2,1,3-benzothiadiazole was obtained by a palladium-catalyzed coupling reaction between 4-formylphenylboronic acid and 4,7-dibromo-2,1,3-benzothiadiazole and purified by column chromatography.

(3) The metalloporphyrin-based conjugated polymer photocatalyst was obtained by a solvothermal reaction with metalloporphyrin and 4,7-bis(4-formylphenyl)-2,1,3-benzothiadiazole as starting materials under reduced pressure.

Step (1) is as follows:

Under $N_2$ atmosphere, 4-nitrobenzaldehyde was placed in the flask followed by adding propionic acid and acetic anhydride. Then the mixture was heated at 140-160° C. and refluxed, to which pyrrole was added, and the reflux reaction was continued for 30-60 min. After the reaction was naturally cooled to room temperature, the precipitate was collected and washed with ultrapure water and methanol, dried under vacuum. The obtained powder was dissolved in pyridine and refluxed for 30-60 min, then the mixture was cooled to 0° C. and placed in the refrigerator for 5-6 h. The precipitate was collected by filtration and washed with acetone to obtain a dark purple solid powder.

The dark purple solid powder was dissolved in concentrated hydrochloric acid followed by adding dropwise of concentrated hydrochloric acid solution with stannous chloride. The mixture was stirred at room temperature for 1-3 h, then stirred at 70-90° C. for 30-60 min and cooled to 0° C. Then green solid is obtained by suction filtration, and the pH value is adjusted to 9-10 with concentrated ammonia to obtain a crude product. Finally, the crude product was extracted and purified by chloroform through Soxhlet extraction. Rotary evaporation of the solution followed by drying under vacuum at 60° C. yielded 5,10,15,20-tetrakis (4-aminophenyl)-porphyrin (TAPP) as a bright purple crystal.

Under the protection of $N_2$, 5,10,15,20-tetrakis(4-aminophenyl) porphyrin, N,N-dimethylformamide/chloroform was placed into a single-necked flask followed by adding 20-25 mL methanol solution with metal acetate salt. Then the mixture was heated to reflux at 80-90° C. for 12-36 h. After naturally cooling to room temperature, the organic solvent was removed by rotary evaporation and concentrated to 10-20 mL, then poured into methanol for recrystallization, the precipitate was collected and washed with ultrapure water and methanol to obtain the metalloporphyrin monomer (MTAPP, M=Cu, Zn, Fe) and dried in a vacuum oven at 60° C. for 12 h.

Synthetic Route:

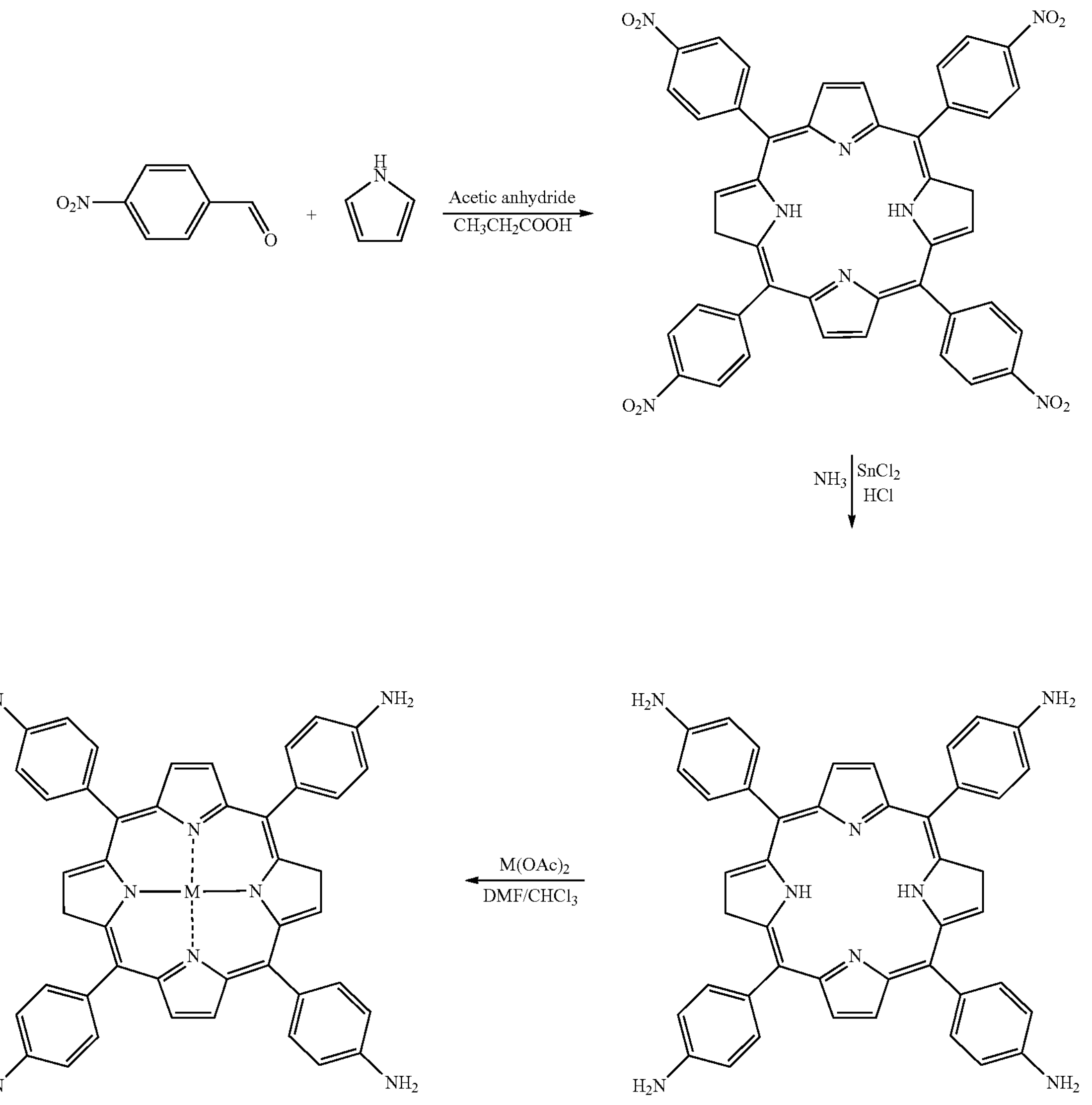

M = Cu, Zn, Fe

Step (2) is as follows:

A cesium carbonate aqueous solution was added to the one-neck flask and degassed with $N_2$. Then anhydrous toluene/anhydrous ethanol, 4-formylbenzeneboronic acid, 4,7-dibromo-2,1,3-benzothiadiazole and tetrakis(triphenylphosphine) palladium were successively added and degassed twice. The reaction was refluxed at 75-85° C. for 12-24 h. After the reaction, the mixture was poured into water and extracted with chloroform three times. The organic solvent was removed by rotary evaporator to obtain a crude product. Finally, 4,7-bis(4-formylphenyl)-2,1,3-benzothiadiazole was purified by column chromatography and dried in a vacuum oven at 60° C. In the process of column chromatography, the stationary phase is silica gel, the mobile phase is dichloromethane/n-hexane with volume ratio of 10-6:1.

Synthetic Route:

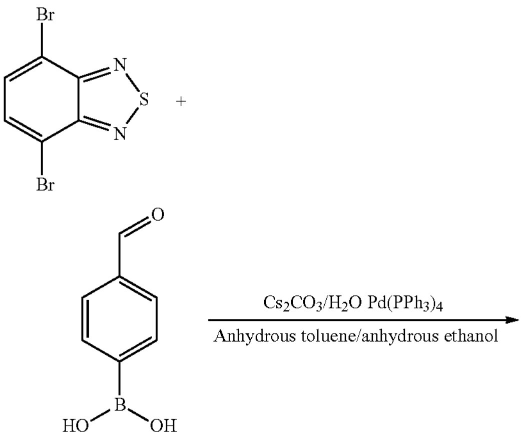

-continued

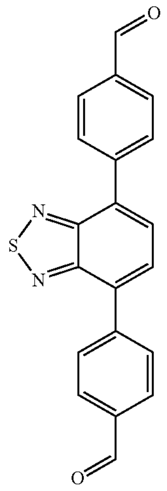

Step (3) is as follows:

A 10 mL Schlenk tube was placed with metalloporphyrin, 4,7-bis(4-formylphenyl)-2,1,3-benzothiadiazole and o-dichlorobenzene/n-butanol, acetic acid as catalyst, after ultrasonic dispersion for 10-15 min and degassing for 30 min, the tube was heated at 100-140° C. under reduced pressure for 48-96 h. After naturally cooled to room temperature, the precipitate was collected by filtration and extracted with dioxane and acetone for 12-36 h respectively to remove unreacted monomers, and the final product metalloporphyrin-based conjugated polymer was dried in a vacuum oven at 100° C. for 12 h.

Synthetic Route:

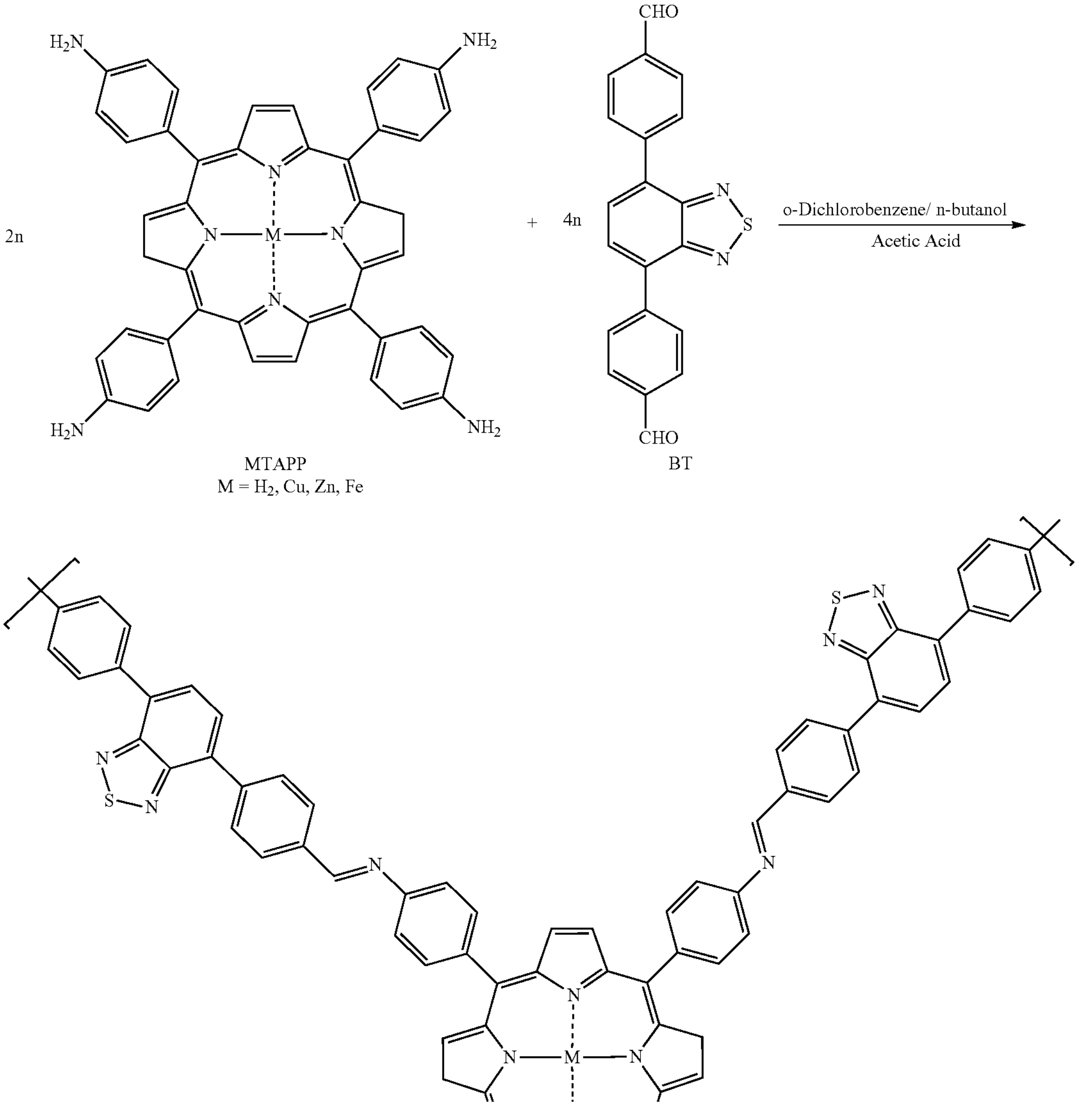

MTAPP
M = $H_2$, Cu, Zn, Fe

BT

-continued

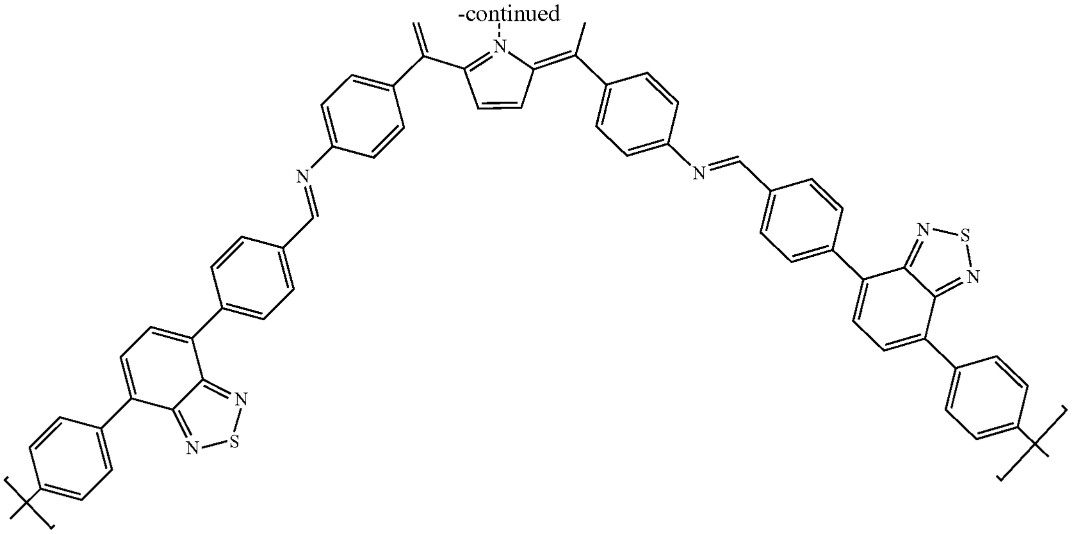

MTAPP-BT

All raw materials involved in the present invention are commercially available. And the specific operation methods are conventional techniques, unless otherwise specified. The preparation is carried out in a conventional environment.

Example 1

First, metalloporphyrin monomer was synthesized in the present invention, and the specific steps are as follows:

11.0 g 4-nitrobenzaldehyde, 300 mL propionic acid and 12 mL acetic anhydride were added in to 500 mL three-necked flask. The resulting solution was refluxed at 150° C. under $N_2$, to which 5 mL pyrrole was slowly added. After refluxing for 30 min, the mixture was cooled naturally to get a black precipitate collected by filtration, following washed with $H_2O$ and methanol, dried under vacuum at 60° C. The resulting powder was taken up in 35 mL pyridine, refluxed with stirring for 60 min. After cooled and stored at 0° C. for 6 h, the precipitate was collected by filtration and washed with acetone to obtain 5,10,15,20-tetra(4-nitrophenyl) porphyrin as a dark purple powder and dried under vacuum at 60° C. for 12 h.

Further, 2 g above product dark purple powder was dissolved in 125 mL concentrated hydrochloric acid, to which a solution of stannous chloride (9.0 g, 40 mmol) in 25 mL of concentrated hydrochloric acid was added. The resulting mixture was stirred at room temperature for 2.5 h and then heated at 80° C. for 30 min. After cooling to 0° C., the mixture was filtered to give greenish solid, then pH value was adjusted to 9 by slow addition of concentrated ammonia to get crude product. Finally, the crude product was extracted and purified through chloroform by Soxhlet extraction, and the organic solvent was removed by rotary evaporation to obtain a bright purple crystalline solid powder of 5,10,15,20-tetrakis(4-aminophenyl)-porphyrin (TAPP) dried in a vacuum oven at 60° C. As shown in infrared spectrum, the peaks at 1616, 1510, and 1465 $cm^{-1}$ are attributed to vibration absorption of benzene and pyrrole ring skeleton, 979 $cm^{-1}$ corresponds to the N—H stretching vibration in porphyrin, which proves the existence of porphyrin ring. The sharp peaks at 3200-3400 $cm^{-1}$ are derived from the stretching vibration of —$NH_2$. Additionally, in the NMR spectrum, −2.73 ppm corresponds to N—H in porphyrin ring, the single peak of 5.58 ppm is attributed to the $NH_2$ connected to the benzene ring, and two double peaks of 7.0-7.2 and 7.85-7.87 ppm are assigned to benzene ring, 8.89 ppm corresponds to pyrrole β-CH, the above results indicate the successful synthesis of 5,10,15,20-tetra(4-aminophenyl) porphyrin.

Under the protection of $N_2$, 0.3 mmol 5,10,15,20-tetra(4-aminophenyl) porphyrin, 30 mL N,N-dimethylformamide, 90 mL chloroform were added to a single-necked flask followed by adding 20 mL of methanol with 1.5 mmol metal acetate (copper acetate, zinc acetate or iron acetate). The reaction was refluxed at 85° C. for 24 h. After cooled to room temperature naturally, the organic solvent was removed by rotary evaporation and concentrated to 15 mL, pourer into methanol for precipitation. The precipitate was collected and washed with ultrapure water and methanol to obtain metalloporphyrin monomer (MTAPP, M=Cu, Zn, Fe), and dried in a vacuum oven at 60° C. for 12 h. Compared with the uncoordinated porphyrin monomer, the infrared spectrum shows that metalloporphyrin exhibited a peak at 1000 cm' attributed to coordination bond M-N between the metal and N atom of pyrrole, which proved the successful coordination of metal atom.

Example 2

The synthesis of 4,7-bis(4-formylphenyl)-2,1,3-benzothiadiazole (BT) monomer, the specific steps are as follows:

9 mL of 6 mol/L cesium carbonate aqueous solution was added to a 100 mL single-necked flask and degassed with $N_2$ for 20 min. Then 25 mL anhydrous toluene and 17 mL anhydrous ethanol, 1.25 g 4-formylphenylboronic acid, 1 g 4,7-dibromo-2,1,3-benzothiadiazole and 200 mg tetrakis(triphenylphosphine) palladium were added and then degassed twice for 20 min each time. The reaction was refluxed at 75° C. for 12 h under $N_2$ atmosphere. After reaction, the mixture was poured into water and extracted with chloroform three times. The organic solvent was removed by a rotary evaporator to obtain a crude product. Finally, the obtained 4,7-bis(4-formylphenyl)-2,1,3-benzothiadiazole was purified by column chromatography (the stationary phase is silica gel, the mobile phase is dichloromethane/n-hexane with volume ratio of 8:1), dried in a vacuum oven at 60° C. It can be observed from the infrared spectrum that 1701 cm' corresponds to the terminal aldehyde groups, 1602 cm' is assigned to C═N of benzothiadiazole, and 1309, 1213 and 1164 cm' are attributed to the stretching vibration of the benzene ring skeleton. In addition, NMR spectrum show that 10.13 ppm corresponds to the terminal aldehyde groups, and the two double peaks of 8.17-8.19 and 8.07-8.09 correspond to the phenyl groups, 7.91 ppm single peak is derived from the benzene ring of benzothiadiazole. The above results indicate the successful synthesis of 4,7-bis(4-formylphenyl)-2,1,3-benzothiadiazole.

Example 3

Figure 2:
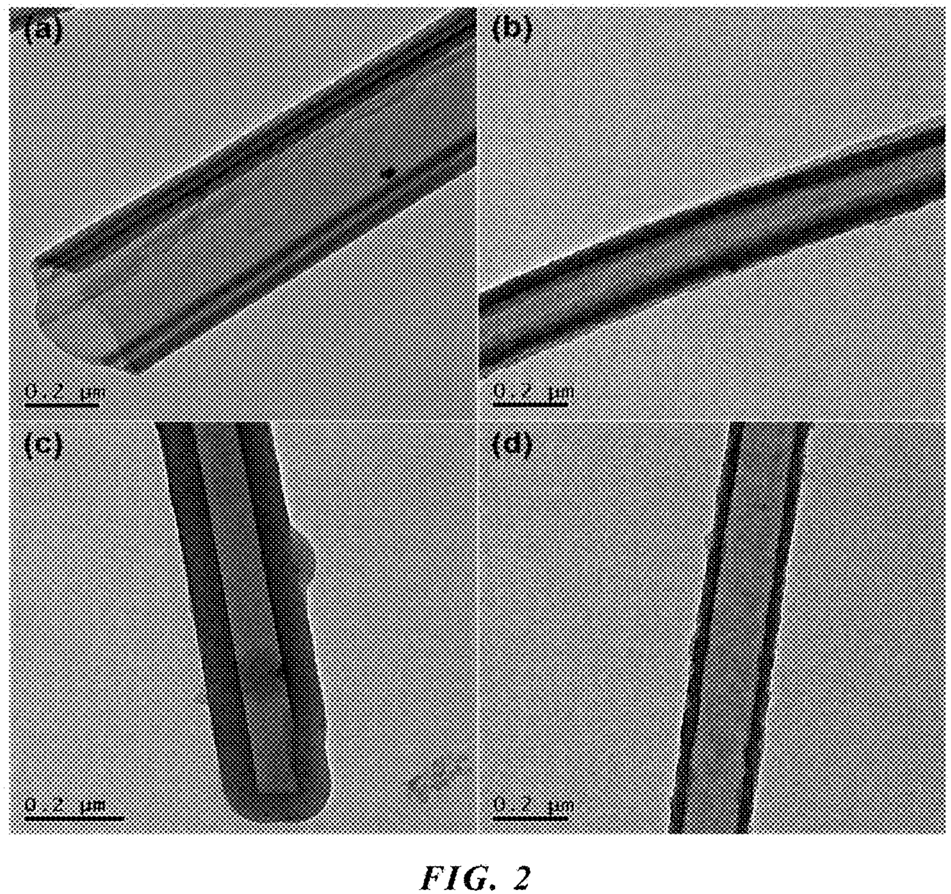
FIG. 2 shows the TEM images of metalloporphyrin-based conjugated polymers in Example 3 (a), Example 4 (b), Example 5 (c) and Example 6 (d).

Preparation of porphyrin-based conjugated polymer (TAPP-BT), the specific steps are as follows:

33.0 mg 5,10,15,20-tetra(4-aminophenyl) porphyrin, 34.5 mg 4,7-bis(4-formylphenyl)-2,1,3-benzothiadiazole, o-dichlorobenzene/n-butanol (volume ratio is 1:1, 4 mL), 0.4 mL 6 mol/L acetic acid as catalyst were added to a 10 mL Schlenk tube. After ultrasonic dispersion for 15 min and degassing for 30 min, the reaction tube was evacuated to 50 mtorr by oil pump in liquid $N_2$ bath, and then heated at 120° C. for 72 h. After cooled to room temperature, the precipitate was collected by filtration and washed with acetone three times and then extracted with dioxane and acetone by Soxhlet extraction for 24 h to remove unreacted monomers. The obtained product porphyrin-based conjugated polymer was dried in a vacuum oven at 100° C. for 12 h. The infrared spectrum and TEM image were shown in FIG. 1(*a*) and FIG. 2(*a*). The infrared spectrum shows that the characteristic peaks of the amino group at 3200-3400 $cm^{-1}$ and the aldehyde group at 1700 $cm^{-1}$ are weakened after polymerization, and the characteristic peak at 1602 $cm^{-1}$ of C═N stretching vibration appeared, which proves the successful synthesis of porphyrin-based conjugated polymer (TAPP-BT). It can be seen from the TEM image that the porphyrin-based conjugated polymer in the present invention exhibits the morphology of hollow nanotubes.

Example 4

Preparation of zinc porphyrin-based conjugated polymer (ZnTAPP-BT), the specific steps are as follows:

37.0 mg 5,10,15,20-tetra(4-aminophenyl) porphyrin zinc, 34.5 mg 4,7-bis(4-formylphenyl)-2,1,3-benzothiadiazole, o-dichlorobenzene/n-butanol (volume ratio is 1:1, 4 mL), 0.4 mL 6 mol/L acetic acid as catalyst were added to a 10 mL Schlenk tube. After ultrasonic dispersion for 15 min and degassing for 30 min, the reaction tube was evacuated to 50 mtorr by oil pump in liquid $N_2$ bath, and then heated at 120° C. for 72 h. After cooled to room temperature, the precipitate was collected by filtration and washed with acetone three times and then extracted with dioxane and acetone by Soxhlet extraction for 24 h to remove unreacted monomers. The obtained product porphyrin-based conjugated polymer was dried in a vacuum oven at 100° C. for 12 h. The infrared spectrum and TEM image were shown in FIG. 1(*b*) and FIG. 2(*b*). The infrared spectrum shows that the characteristic peak at 1000 $cm^{-1}$ corresponds to Zn—N of zinc porphyrin-based conjugated polymer.

Example 5

Preparation of copper porphyrin-based conjugated polymer (CuTAPP-BT), the specific steps are as follows:

36.0 mg 5,10,15,20-tetra(4-aminophenyl) porphyrin copper, 34.5 mg 4,7-bis(4-formylphenyl)-2,1,3-benzothiadiazole, o-dichlorobenzene/n-butanol (volume ratio is 1:1, 4 mL), 0.4 mL 6 mol/L acetic acid as catalyst were added to a 10 mL Schlenk tube. After ultrasonic dispersion for 15 min and degassing for 30 min, the reaction tube was evacuated to 50 mtorr by oil pump in liquid $N_2$ bath, and then heated at 120° C. for 72 h. After cooled to room temperature, the precipitate was collected by filtration and washed with acetone three times and then extracted with dioxane and acetone by Soxhlet extraction for 24 h to remove unreacted monomers. The obtained product porphyrin-based conjugated polymer was dried in a vacuum oven at 100° C. for 12 h. The infrared spectrum and TEM image were shown in FIG. 1(*c*) and FIG. 2(*c*). The infrared spectrum shows that the characteristic peak at 1000 cm' corresponds to Cu—N of copper porphyrin-based conjugated polymer.

Example 6

The preparation of iron porphyrin-based conjugated polymer (FeTAPP-BT), the specific steps are as follows:

36.6 mg 5,10,15,20-tetra(4-aminophenyl) porphyrin iron, 34.5 mg 4,7-bis(4-formylphenyl)-2,1,3-benzothiadiazole, o-dichlorobenzene/n-butanol (volume ratio is 1:1, 4 mL), 0.4 mL 6 mol/L acetic acid as catalyst were added to a 10 mL Schlenk tube. After ultrasonic dispersion for 15 min and degassing for 30 min, the reaction tube was evacuated to 50 mtorr by oil pump in liquid $N_2$ bath, and then heated at 120° C. for 72 h. After cooled to room temperature, the precipitate was collected by filtration and washed with acetone three times and then extracted with dioxane and acetone by Soxhlet extraction for 24 h to remove unreacted monomers. The obtained product porphyrin-based conjugated polymer was dried in a vacuum oven at 100° C. for 12 h. The infrared spectrum and TEM image were shown in FIG. 1(*d*) and FIG. 2(*d*). The infrared spectrum shows that the characteristic peak at 1000 cm' corresponds to Fe—N of iron porphyrin-based conjugated polymer.

Example 7

Figure 3:
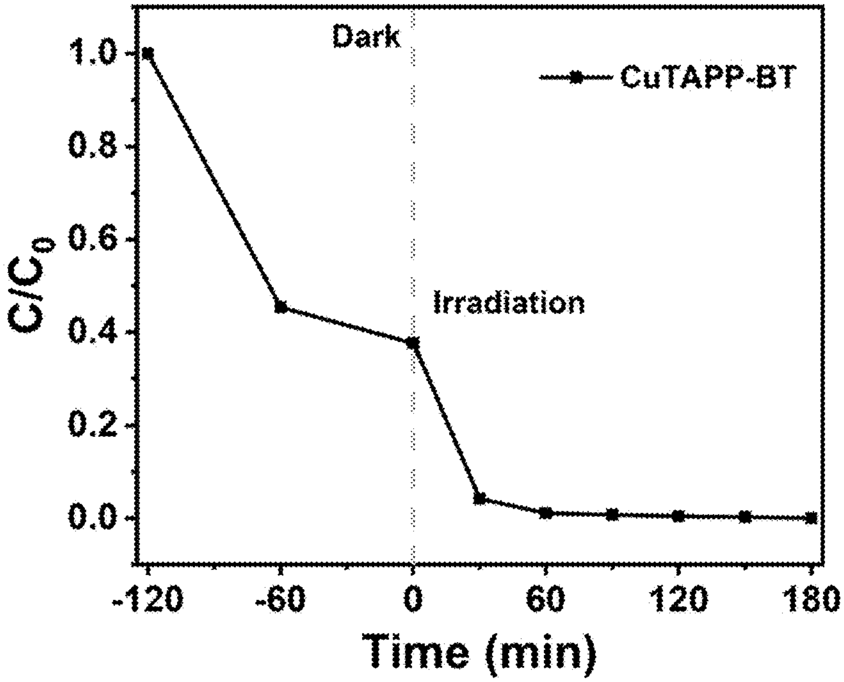
FIG. 3 shows the degradation of bisphenol A by copper porphyrin-based conjugated polymer (CuTAPP-BT) photocatalyst in Example 5.

The photocatalytic degradation of bisphenol A in water by metalloporphyrin-based conjugated polymer organic photocatalysts: 25 mg porphyrin-based conjugated polymer organic photocatalysts obtained in Example 3, Example 4, Example 5 or Example 6 were dispersed in 50 mL of 15 mg/L bisphenol A aqueous solution, and stirred for 2 h in the dark to achieve adsorption-desorption equilibrium. After equilibration, the degradation experiment was performed by the prepared photocatalysts under irradiation provide by a cold light source of 300 W xenon lamp, 1 mL aliquot of the suspension was taken from the quartz reactor per 30 min, and then filtered through a Millipore filter for HPLC analysis. The signal intensity of the water sample was measured by a UV detector (λ=280 nm), and the residual concentration of BPA in the corresponding water sample is calculated by referring to the standard curve. FIG. 3 shows the relationship between the concentration of residual BPA and degradation time over the copper porphyrin-based conjugated polymer organic photocatalyst in Example 5. It can be seen that the removal rate of BPA is up to more than 99% after 60 min light irradiation. Compared with the other porphyrin-based conjugated polymer photocatalysts in Examples 3, 4 and 6, the photocatalyst in Example 5 exhibits the best photocatalytic activity. Table 1 shows the removal rate of BPA after 60 min light irradiation over different catalysts, using the same experimental method.

TABLE 1

The removal rate of bisphenol A by different catalysts

| Samples | Removal Rate |
|---|---|
| Example 3 | 67.1% |
| Example 4 | 69.8% |
| Example 5 | 99.0% |
| Example 6 | 62.9% |

The invention discloses a visible-light driven organic photocatalyst based on porphyrin structure. First, 5,10,15,20-tetra(4-aminophenyl) porphyrin monomers were synthesized, and coordinated with metal acetate to obtain corresponding metalloporphyrin monomers. Then, 4,7-bis(4-formylphenyl)-2,1,3-benzothiadiazole monomer was synthesized by palladium-catalyzed coupling reaction. Finally, a new type of metalloporphyrin-based conjugated polymer organic photocatalysts were obtained by the solvothermal method between metalloporphyrin and benzothiadiazole monomers. The materials were applied for catalytic reaction, the hollow nanotube morphology of the metalloporphyrin-based conjugated polymer provides a large specific surface area and abundant active sites to promote the adsorption of organic pollutants and surface catalytic reaction of the catalysts. At the same time, metal coordination introduces variety of metal active sites, which can accelerate the intramolecular charge transfer and separation, thereby improving the photocatalytic efficiency.

In summary, the present invention constructs a metalloporphyrin-based conjugated polymer organic photocatalysts with visible-light response. This design is not only conducive to the transfer and separation of charges, but also improves the adsorption capacity to organic pollutants molecules. Meanwhile, variety of surface metal catalytic reactive sites can be exposed. In terms of catalytic performance, the above prepared copper porphyrin-based conjugated polymer organic photocatalyst (CuTAPP-BT) shows effective degradation of bisphenol A in water.

The invention claimed is:

1. A method for preparing a metalloporphyrin-based conjugated polymer, comprising:

reacting 4-nitrobenzaldehyde and pyrrole to obtain 5,10,15,20-tetra(4-nitrophenyl) porphyrin, reducing 5,10,15,20-tetra(4-nitrophenyl) porphyrin in concentrated hydrochloric acid to obtain 5,10,15,20-tetra(4-aminophenyl) porphyrin, and heating 5,10,15,20-tetra(4-aminophenyl) porphyrin and a metal acetate in a mixed solvent under $N_2$ atmosphere to obtain a metalloporphyrin; and under an inert atmosphere, conducting a solvothermal reaction of the metalloporphyrin and 4,7-bis(4-formylphenyl)-2,1,3-benzothiadiazole to obtain the metalloporphyrin-based conjugated polymer.

2. The method according to claim 1, wherein a molar ratio of 4-nitrobenzaldehyde and pyrrole is 1:1-1.2, the reaction is conducted at 140-160° C. for 30-60 min; stannous chloride ($SnCl_2$) is selected as a reductant in the reduction, the reduction is conducted at 70-90° C. for 30-60 min; and the metal acetate is copper acetate monohydrate, anhydrous zinc acetate or ferric acetate hydrate, a molar ratio of 5,10,15,20-tetra(4-aminophenyl) porphyrin and the metal acetate is 1:2-4, the mixed solvent is a mixture of dimethylformamide (DMF) and chloroform, the heating reaction is conducted at 80-90° C. for 12-36 h.

3. The method according to claim 1, wherein 4,7-bis(4-formylphenyl)-2,1,3-benzothiadiazole is synthesized through a palladium-catalyzed coupling reaction between 4-formylphenylboronic acid and 4,7-dibromo-2,1,3-benzothiadiazole.

4. The method according to claim 3, wherein the palladium-catalyzed coupling reaction is carried out in an alkaline environment, under $N_2$ atmosphere and in a solvent, and the reaction is conducted at 75-85° C. for 12-24 h.

5. The method according to claim 1, wherein a molar ratio of the metalloporphyrin and 4,7-bis(4-formylphenyl)-2,1,3-benzothiadiazole is 1:2-3, o-dichlorobenzene/n-butanol is a solvent for the solvothermal reaction, and the solvothermal reaction is conducted at 100-140° C. for 48-96 h.

6. The method according to claim 1, comprising the following steps:

1) under an inert atmosphere, conducting a solvothermal reaction of the metalloporphyrin (MTAPP) and 4,7-bis(4-formylphenyl)-2,1,3-benzothiadiazole (BT) to obtain the metalloporphyrin-based conjugated polymer (MTAPP-BT);

2) adding the metalloporphyrin-based conjugated polymer to water containing organic pollutants, and removing the organic pollutants in the water under irradiation.

7. The method according to claim 6, wherein the metalloporphyrin and 4,7-bis (4-formylphenyl)-2,1,3-benzothiadiazole are starting materials and react under a catalyst to obtain the metalloporphyrin-based conjugated polymer.

8. The method according to claim 6, wherein the organic pollutants are phenolic pollutants.

* * * * *